Nov. 22, 1938.　　　　E. S. BISSELL　　　　2,137,328
MATERIAL AGITATING MEANS
Filed Aug. 18, 1937　　　2 Sheets-Sheet 1
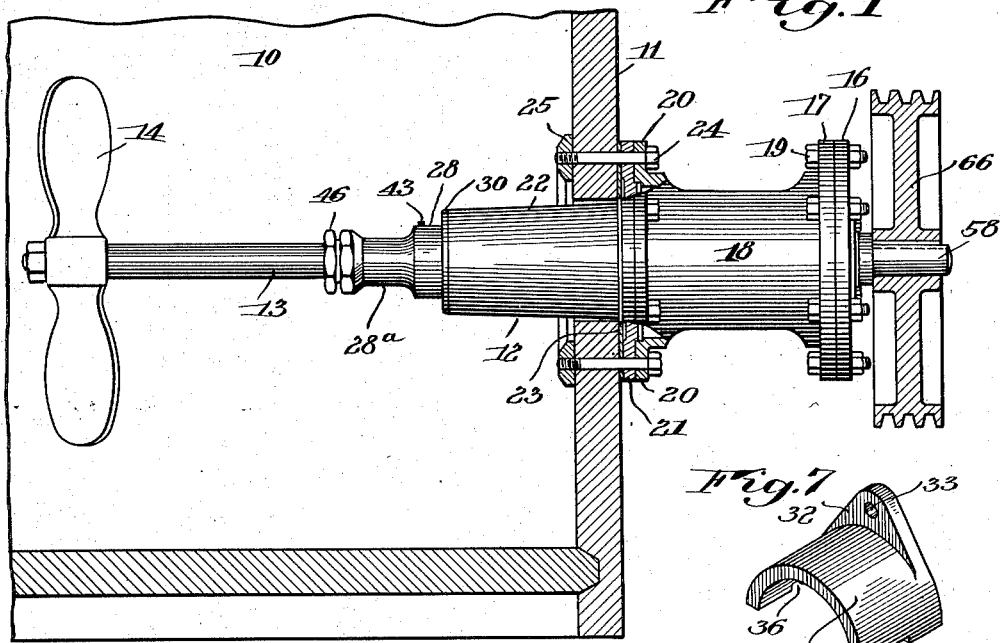
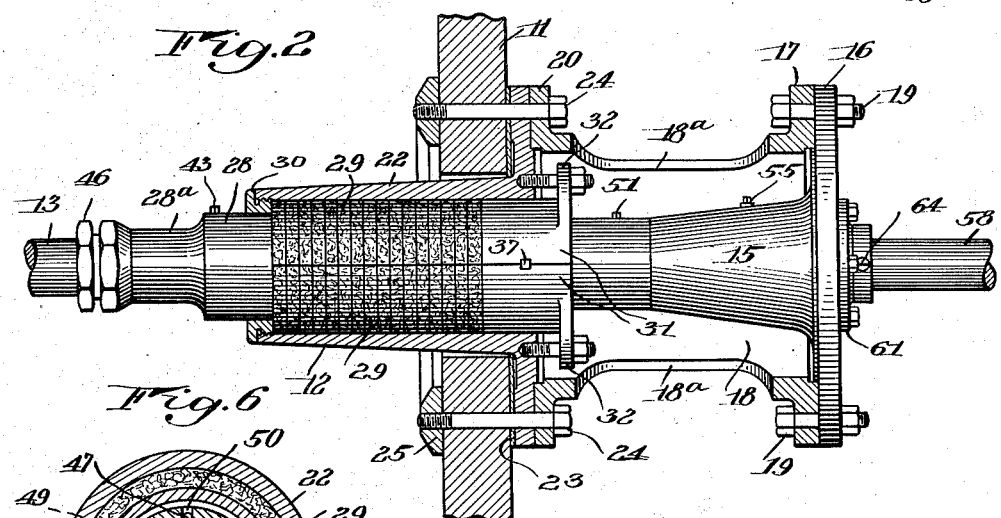
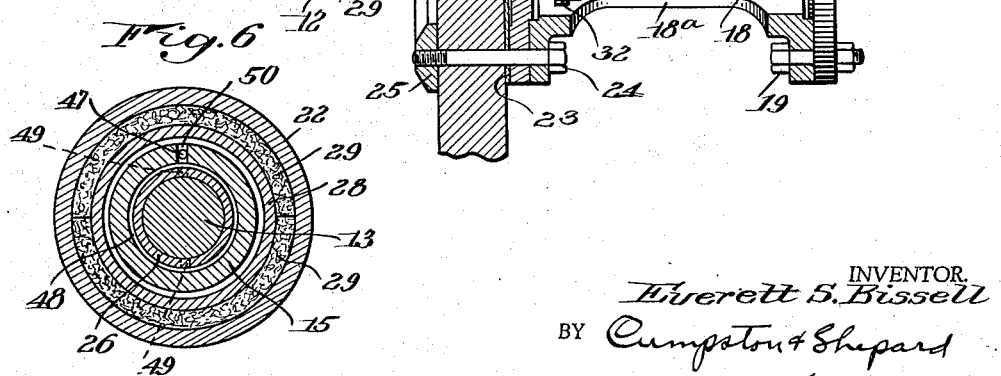
INVENTOR.
Everett S. Bissell
BY Cumpston & Shepard
his ATTORNEYS

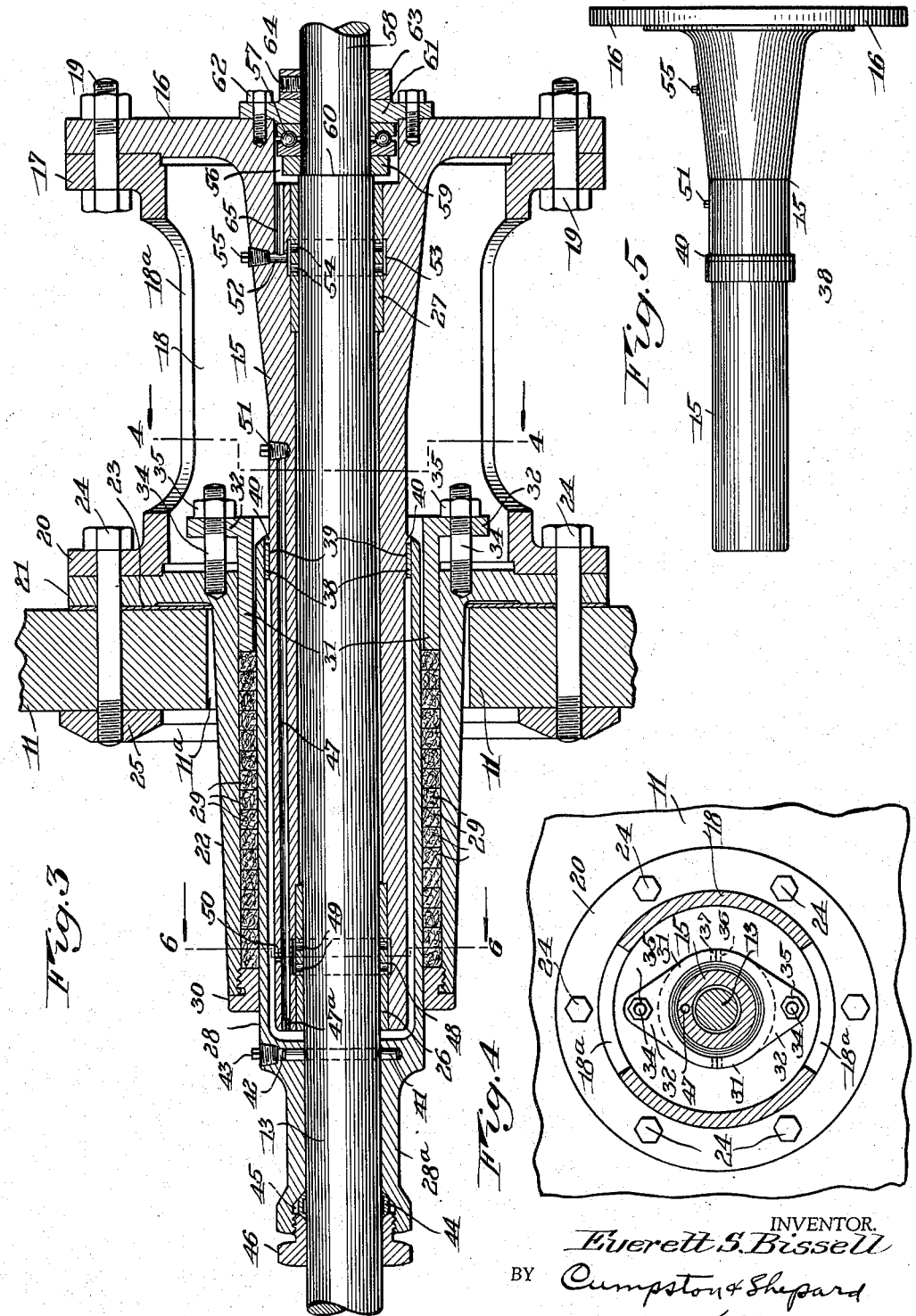

Patented Nov. 22, 1938

2,137,328

UNITED STATES PATENT OFFICE 2,137,328

MATERIAL AGITATING MEANS

Everett S. Bissell, Irondequoit, N. Y., assignor to Mixing Equipment Co., Inc., Rochester, N. Y., a corporation of New York Application August 18, 1937, Serial No. 159,750

10 Claims. (Cl. 308—36.1)

The present invention relates to material agitating and mixing means and embodies improved means for agitating, mixing, and circulating various materials either in fluid, solid, liquid, or semi-liquid form such, for example, as food products, chemicals, paints, oils and various other materials.

The invention has for its object to provide in apparatus of this class an improved agitating or mixing device which can be readily and conveniently applied as a unit to a tank or receptacle containing the material to be acted upon and which is of simple construction, efficient in service and economical to operate.

A further object of the invention is to provide in apparatus of the class described an improved bearing structure for the agitator shaft, embodying novel and efficient means for preventing the liquid or fluid contained in the tank from coming in contact with the bearings and injuring the same.

A further object of the invention is to provide a tank or receptacle having a shaft extending inwardly through a wall thereof and provided therein with means for agitating or working the fluid and also provided with bearing means surrounded by a stuffing box extending from said wall within the receptacle and between which and the bearing means a sleeve is interposed and made fluid-tight on the shaft and for cooperation with the packing of the stuffing box to protect the bearing means from fluid leakage past the packing.

A further object of the invention is to so construct and mount the stuffing box within the receptacle as to render the packing readily accessible from the exterior of the receptacle, and also to mount the shaft bearing means for removal outwardly from the sleeve carried by the shaft without breaking the seal between the sleeve and stuffing box.

A further object of the invention is to provide a fluid holding tank or receptacle having a shaft extending inwardly through a wall thereof and rotatable within a tubular supporting member detachably connected with the receptacle and having spaced inner and outer bearings disposed interiorly and exteriorly of the receptacle respectively, and in which arrangement the inner end of said tubular member is housed within a sleeve fixed on and having a fluid-tight connection with the shaft and also having a bearing on said tubular supporting member, the sleeve being rotatable with the shaft and within a stuffing box extending from said wall within the receptacle and cooperating with the sleeve to prevent escape of the fluid.

A further object of the invention is to provide an improved mounting structure for the shaft in which adequate support for the inner and outer bearings is afforded and and the desired distance between the same maintained, and in which complete separation of the bearings from the stuffing box is provided for, the inner bearing being projected well into the tank to reduce the free overhang of the shaft to a minimum.

A further object of the invention is to provide a bearing structure of the class described, in which proper alinement of the bearings is maintained under all conditions of operation, regardless of any movement or warping of the wall of the tank upon which the mixing unit is secured.

A further object of the invention is to provide improved means by which the bearings of the structure may be readily and conveniently lubricated from the exterior of the tank, after the unit has been inserted within and connected with the tank.

A further object of the invention is to provide an improved shaft bearing structure embodying comparatively few parts which can be readily assembled to form a unit and installed as such, and which can be economically constructed and maintained at a relatively low cost.

To these and other ends the invention resides in certain improvements and combinations of parts, all as will be hereinafter more fully described, the novel features being pointed out in the claims at the end of the specification.

In the drawings:

Fig. 1 is a part sectional elevation illustrating one embodiment of the invention;

Fig. 2 is a longitudinal sectional elevation taken through the outer walls of the mixer, including the stuffing box and the outer shaft supporting frame;

Fig. 3 is a somewhat similar view, drawn to an enlarged scale and showing the various parts surrounding the agitator shaft in section;

Fig. 4 is a transverse section on line 4—4 of Fig. 3;

Fig. 5 is a detailed view of the tubular support for housing the shaft bearings;

Fig. 6 is a transverse section on line 6—6 of Fig. 3, and

Fig. 7 is a view in perspective of one of the elements for compressing the packing within the stuffing box.

The same reference numerals throughout the several views indicate the same parts.

Referring to the drawings, 10 designates a tank or receptacle of any preferred design which may be constructed of any suitable material. Extending through an opening 11a in the side wall 11 of the tank is a mixing or agitating unit designated generally by the reference numeral 12. The agitator shaft is indicated at 13 and has on its inner end suitable means for agitating, circulating, and mixing the materials such, for example, as the propeller 14. The main supporting element for the shaft comprises the unitary tubular bearing support 15 shown in Figs. 3 and 5, the inner end of which is extended within the tank and the outer enlarged end of which is provided with a flange 16 seated on the outer flange 17 of a housing or frame-like member 18 and connected therewith by the bolts 19, Fig. 3. The inner end of the housing member is provided with a flange 20, seated on a flange 21 formed on the outer end of the stuffing box casing 22, which is projected into the tank as shown in Fig. 3. A gasket 23 is interposed between the stuffing box flange 21 and the tank wall 11 to seal the joint between the same. The flanges 20 and 21 are clamped together and upon the tank wall by a suitable number of bolts 24, the inner ends of which are threaded within a metal ring 25 disposed on the inner face of the wall 11 and clamped thereon by the bolts.

The tubular bearing member 15 is provided with inner and outer bearings 26 and 27, respectively, by which the shaft 13 is supported for rotation, said bearing supporting member being recessed adjacent its opposite ends to receive the bearings, as shown in Fig. 3.

Surrounding the portion of the bearing supporting member 15 disposed within the tank and also disposed within the stuffing box 22, is a sleeve or cylinder 28 which is fixed on the shaft 13 for rotation therewith in contact with the packing 29 of the stuffing box, which serves to prevent escape of the fluid or liquid around the sleeve and from the tank. The packing may be formed of any suitable material and preferably comprises semi-circular sections surrounding the sleeve, as shown at Fig. 6. The stuffing box casing 22 has threaded in its inner end a ring or plug 30 against which the packing is forced by the semi-circular compressor elements 31 interposed between the sleeve 28 and the stuffing box casing 22, as shown in Figs. 3 and 4. Each of said elements is provided with a flange 32 having an opening 33 for the reception of a bolt 34 threaded within the outer end of the stuffing box casing as shown in Fig. 3. The bolts are provided with nuts 35 for forcing the semi-circular elements 31 inwardly of the stuffing box casing to compress the packing therein. The compressor elements are provided with opposite pairs of registering notches 36 within each of which is disposed a key 37 for maintaining said elements in proper alinement to insure application of uniform pressure on the oppositely disposed semi-circular packing sections 29.

The sleeve 28 is rotatably supported at its inner end by a bearing 38 positioned upon a seat 39 formed on the tubular support 15, said bearing having its outer end in engagement with an annular shoulder 40 formed on the support, Figs. 3 and 5. The sleeve 28 is fixed on the shaft 13 by means of a pin 41 extending through the shaft and disposed in a transverse bore 42 formed therein, the outer end of the bore being closed by a screw plug 43, as shown in Fig. 3. The inner end of the sleeve is reduced at 28a and is made to closely fit the portion of the shaft about which it extends. The fluid or liquid is prevented from passing along the shaft to the bearing 26 within the sleeve by a suitable seal such for example, as the lead ring 44 housed within the recess 45 formed in the end of the reduced portion 28a of the sleeve and compressed therein by the nut 46 to seal the joint between the sleeve and the shaft, as shown in Fig. 3.

The tubular supporting member 15 is provided with a longitudinally extending lubricant feed passage 47 closed at its inner end by a plug 47a, said passage communicating with an annular recess 48 formed in said member in surrounding relation with respect to the bearing and also communicating with the transversely extending aperture 49 of the bearing through which the lubricant is adapted to discharge to the interior of the bearing and to the shaft extending through the same. The lubricant is also adapted to be discharged from the passage 47 to the exterior of the sleeve through a transverse aperture 50 to the space between the bearing supporting member 15 and the sleeve whereby to supply lubricant to the sleeve bearing 38. The supply passage 47 is normally closed by a screw plug 51 which may be removed when desired to permit the lubricant to be delivered to said passage under pressure from a suitable supply source, not shown.

Lubricant may also be supplied to the outer shaft bearing 27 through a passage 52 formed in the outer end of the supporting member 15 and communicating with an annular recess 53 surrounding the bearing which is in communication with the transverse apertures 54 formed therein, whereby lubricant is supplied to the interior of the bearing and to the shaft extending through the bearing. A screw plug 55 serves to normally close the passage 52 but may be removed when desired to permit the lubricant to be supplied under pressure to said passage.

The outer end of the bearing support 15 is provided with a recess 56 within which is disposed a thrust bearing 57 on the reduced portion 58 of the agitator shaft 13. A thrust collar 59 is interposed between the bearing and a shoulder 60 of the shaft. A cover plate 61 serves to close the recess 56 and also forms a seat for the thrust bearing 57, said plate being secured in position by the bolts 62. A thrust collar 63 is disposed on the reduced portion 58 of the shaft in engagement with the cover plate, said collar being held in position by a set screw 64, as shown in Fig. 3.

Communicating with the recess 56 containing the thrust bearing is a lubricant feed passage 65, which in turn communicates with the lubricant supply passage 52 whereby a certain amount of the lubricant delivered to the passage 52 will find its way to the passage 56 of the thrust bearing. A grooved pulley 66 is keyed on the reduced portion 58 of the agitator shaft for operation by an electric motor and suitable belts to be driven thereby, not shown.

From the present structure it will be noted that both the packing and bearings are rendered readily accessible from the exterior of the tank. For example in the case of the packing, upon removal of the nuts 35 from the bolts 34, the compressor unit 31 may be moved outwardly on the tubular support 15 far enough to permit the sections of the unit to be separated and withdrawn through the openings 18a of the housing 18. A suitable tool may then be inserted within the casing 22 for engaging and withdrawing the packing ring sections therefrom and from the housing 18, after which new packing may be inserted within the casing and forced therein by the compressor element 31 upon tightening the nuts 35 of the bolts 34. These operations it will be noted do not require detachment of the unit from the tank or separation of any of the main structural elements of the unit, as has heretofore been necessary in bearing structures of this type. A saving therefore is afforded both with respect to the time required to repack the stuffing box and the cost of the work.

In the case of the main shaft bearings the latter may be rendered accessible for removal by first removing the pulley and thrust bearing from the shaft and detaching the bolts 19 and moving the tubular section 15 outwardly through the housing 18. When this has been done the bearings 26, 27, and 38 can be readily removed and new bearings substituted therefor, each of which operations can be performed from the exterior of the tank and without disturbing the relationship of the shaft and its sleeve and the stuffing box surrounding the same.

Moreover the placing of the stuffing box within the tank and outside of and coextensive with the inner bearings serves to reduce the over-all length of the unit and permits the inner bearing to be projected well into the tank, whereby to reduce the free overhang to a minimum and whereby the desired distance between the bearings may be maintained and adequate support for the shaft provided for, not to mention the fact that the propeller may be located at a distance from the wall of the tank at which it will operate most effectively.

Furthermore the means provided for preventing the escape of the fluid or liquid from the tank or to the shaft bearings, including the sleeve 28 and the packing in contact with which it rotates and the lead seal 44 surrounding the shaft within the reduced inner end of the sleeve is adequate for the purpose provided. The protection of the bearings in the manner described is highly important and particularly so in cases where certain chemicals are to be circulated within the tank or liquids carrying abrasives in suspension, which if allowed to reach the bearings would injure the same.

The various parts of the unit, other than the propeller, may be readily assembled and inserted in position within the tank and connected therewith, as shown in Figs. 3 and 4. The rigid construction of the unit and the means provided for connecting it with the tank, insures proper alinement of the bearings and other parts under all conditions of operation, and regardless of any warping of the tank wall upon which the unit is mounted.

While I have shown an agitating or mixing unit applied to a tank in which various materials may be circulated, agitated or mixed, it will be understood that the invention is not limited in use to mixing or agitating equipment, but may be employed in connection with other equipment such, for example, as pumps, steam boilers, propeller shaft mountings for boats, and various other installations in connection with which the invention may be found useful.

It will be understood that the term "working the fluid", employed in the claims, is intended to cover circulation, agitation, mixing, blending or conditioning the various materials to be acted upon within the receptacle for whatever purpose desired.

I claim:

1. In apparatus of the class described, a shaft for extension inwardly through a wall of a fluid holding receptacle, a sleeve having a fluid tight connection with said shaft and extending outwardly in spaced relation thereto, a stuffing box between said sleeve and said receptacle with its packing accessible from the exterior of said wall, and bearing means for said shaft extending into said sleeve and protected thereby from fluid leakage past said packing.

2. In apparatus of the class described, a shaft for extension inwardly through a wall of a receptacle containing the fluid, a sleeve surrounding the shaft and having a fluid-tight connection therewith and including a portion extending outwardly from said connection and in spaced relation to the shaft, a stuffing box in surronding engagement with said sleeve portion with its packing acccessible through the outer end thereof and from the exterior of the receptacle, supporting means for said shaft extending within said portion of the sleeve and protected by said sleeve from fluid leakage past said packing, and bearing means for the sleeve interposed between the latter and said supporting means.

3. In apparatus of the class described, a shaft for extension inwardly through a wall of a receptacle containing the fluid, a sleeve surrounding the shaft and having a fluid-tight connection therewith and including a portion extending outwardly from said connection and in spaced relation to the shaft, a stuffing box in surrounding engagement with said sleeve portion with its packing accessible through the outer end thereof and from the exterior of the receptacle, a frame, a tubular support on said frame surrounding the shaft in said sleeve portion, and inner and outer bearings for the shaft within said tubular support and protected by said sleeve from fluid leakage past the packing, said inner bearing lying within said sleeve portion.

4. In apparatus of the class described, a shaft for extension inwardly through a wall of a receptacle containing the fluid, a sleeve surrounding the shaft and having a fluid-tight connection therewith and including a portion extending outwardly from said connection and in spaced relation to the shaft, a stuffing box in surrounding engagement with said sleeve portion, a shaft supporting member having one end extending within said sleeve and the other projecting therefrom, said member having spaced bearings for the shaft, one within said sleeve portion for supporting the shaft at a point interiorly of the receptacle whereby to reduce the overhang of the shaft and another bearing for supporting the shaft at a point exteriorly of the receptacle, said supporting member and the shaft bearings carried thereby being protected by said sleeve from fluid leakage past the packing of the stuffing box.

5. In apparatus of the class described, a shaft for extension inwardly through a wall of a receptacle containing the fluid, a sleeve having a fixed and fluid-tight connection with said shaft and including a portion extending outwardly from said connection and in spaced relation to said shaft, a stuffing box in surrounding engagement with said sleeve portion, said stuffing box having its packing accessible for removal through its outer end, supporting means for said shaft extending within said portion of the sleeve, and bearing means for the sleeve carried by said supporting means, said bearing means being protected by said sleeve from fluid leakage past said packing and said supporting and bearing means being detachably associated with said shaft and stuffing box without removal of either from the receptacle.

6. In apparatus of the class described, a shaft for extension inwardly through a wall of a receptacle containing the fluid, a sleeve surrounding the shaft and having a fluid-tight connection therewith and including a portion extending outwardly from said connection and in spaced relation to the shaft, a stuffing box in surrounding engagement with said sleeve portion, a frame, a tubular supporting member for the shaft connected with the frame and extending therefrom into said sleeve portion, said tubular supporting member serving to engage and support the shaft at points both interiorly and exteriorly of the stuffing box, and gland means for said stuffing box removable with the stuffing box packing from the exterior of said receptacle.

7. In apparatus of the class described, a shaft for extension inwardly through a wall of a receptacle containing the fluid, a sleeve surrounding the shaft and having a fixed and fluid-tight connection therewith and including a portion extending outwardly from said connection and in spaced relation to the shaft, a stuffing box in surrounding engagement with said sleeve portion, a frame, a tubular supporting member for the shaft connected with the frame and extending therefrom into and spaced from said sleeve portion and having inner and outer bearings for the shaft, one within said sleeve portion and another disposed exteriorly thereof, a bearing for the sleeve interposed between the latter and said tubular support, said tubular support having a longitudinally extending lubricant feed passage provided with transversely extending discharge passages one communicating with the space between the tubular support and the sleeve for supplying lubricant to the sleeve bearing and another communicating with the inner bearing of the tubular support for supplying lubricant thereto, the inlet end of said feed passage being accessible from the exterior of the stuffing box.

8. In apparatus wherein a rotatable shaft extends through a wall and is driven by means on the outside of the wall and has mounted on it on the inside of the wall an operating element exposed to liquid, a bearing for said shaft located on the inside of said wall close to said operating element, a rigid support for said bearing, a sleeve rotatable with said shaft and secured thereto in fluid-tight engagement therewith between said bearing and the operating element, said sleeve extending in surrounding relation to the support and the bearing and protecting the bearing from access by the liquid, and packing exterior of said sleeve between the sleeve and the wall.

9. In apparatus wherein a rotatable shaft extends through a wall and is driven by means on the outside of the wall and has on its inner end an operating element exposed to liquid, a bearing for said shaft located on the inside of said wall close to said operating element the shaft being overhung beyond the bearing, a rigid support for said bearing, a sleeve rotatable with said shaft and secured thereto in fluid-tight engagement therewith between said bearing and the operating element, said sleeve extending in surrounding relation to the support and the bearing and protecting the bearing from access by the liquid, and a stuffing box containing packing arranged externally of said sleeve and between said sleeve and the wall, the packing being accessible from the exterior of the wall and the bearing and support therefor being arranged so that they may be withdrawn from the outside of said wall.

10. In apparatus wherein a rotatable shaft extends through a wall and is driven by means on the outside of the wall and has on its inner end an operating element exposed to liquid, a bearing for said shaft located on the inside of said wall close to said operating element, the shaft being overhung beyond the bearing, a rigid support for said bearing extending from the outside of said wall to said bearing, a sleeve rotatable with said shaft and secured thereto in fluid-tight engagement therewith between said bearing and the operating element, said sleeve extending in surrounding relation to the support and the bearing and protecting the bearing from access by the liquid, a stuffing box containing packing arranged externally of the sleeve and between said sleeve and the wall, the packing being accessible from the exterior of the wall, and a lubrication conduit extending through said support from the exterior of said wall to the bearing.

EVERETT S. BISSELL.